United States Patent [19]

Brown

[11] Patent Number: 5,414,341
[45] Date of Patent: May 9, 1995

[54] DC-DC CONVERTER OPERABLE IN AN ASYNCRONOUS OR SYNCRONOUS OR LINEAR MODE

[75] Inventor: Alan E. Brown, Austin, Tex.

[73] Assignee: Benchmarq Microelectronics, Inc., Carrollton, Tex.

[21] Appl. No.: 163,477

[22] Filed: Dec. 7, 1993

[51] Int. Cl.⁶ .................................................. G05F 1/44
[52] U.S. Cl. .................................... 323/268; 323/259; 323/275; 323/285
[58] Field of Search ............... 323/259, 271, 268, 275, 323/285, 344, 350

[56] References Cited

U.S. PATENT DOCUMENTS 5,177,676  1/1993  Inam et al. ...................... 323/285 X Primary Examiner—Thomas M. Dougherty
Assistant Examiner—Shawn Riley
Attorney, Agent, or Firm—Gregory M. Howison

[57] ABSTRACT

A DC-DC converter is provided which is operable to drive a reactive circuit (10) that includes both a series inductor (12) and a capacitor (14) disposed between the output node and ground. The DC-DC converter includes two switches, a transistor switch (20) connected between a positive supply and an input node (16) and a second transistor (28) connected between the node (16) and ground. In one mode of operation, the transistors (20) and (28) operate in an asynchronous regulation mode with clock signals provided to the gates thereof. In a second asynchronous mode of operation, transistor (28) is turned off and replaced by its junction isolation diode (48). The transistor (20) is driven by a clock signal in accordance with an asynchronous regulation mode of operation. In a third mode of operation, the modified asynchronous duty cycle to the gate of transistor (20) is altered. In a fourth mode of operation, a linear regulation circuit (51) and an internal regulation transistor (49) are provided which are connected to the node (16) through a resistor (44). During this mode of operation, transistors (20) and (28) are turned off. By sensing current to the input of transistor (20) during the first, second and third modes of operation, a determination can be made for switching between the first three modes of operation and from the third mode of operation to the fourth mode of operation. The voltage on the input node (16) is sensed through resistor (44) to make a decision to switch from the first to the second mode of operation. At any time, the output voltage on node (18) can be sensed by a switching regulator control circuit (26) to determine that the regulation provided thereby falls below a predetermined regulation threshold and then the asynchronous mode of operation selected.

10 Claims, 6 Drawing Sheets

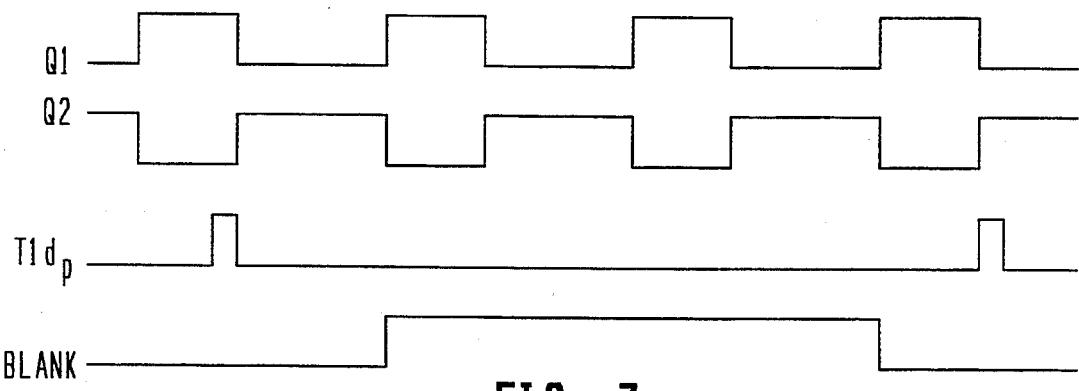
FIG. 7
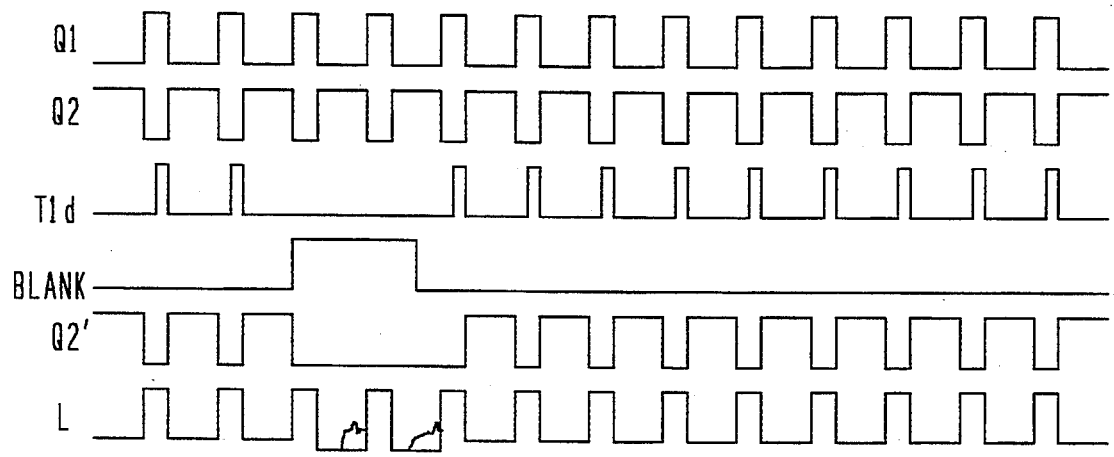
FIG. 8
FIG. 8a

DC-DC CONVERTER OPERABLE IN AN ASYNCRONOUS OR SYNCRONOUS OR LINEAR MODE

TECHNICAL FIELD OF THE INVENTION

The present invention pertains in general to DC-DC converters, and more particularly, to a reconfiguration scheme for the switching network associated with the DC-DC converter to provide improved regulation and efficiency over a wider range of currents.

BACKGROUND OF THE INVENTION

DC-DC converters typically utilize some type of buck converter which has an inductive element and capacitive element arranged to provide a tank circuit having an input and an output. This tank circuit receives a switching input on the input side, this input side being switched between a positive DC voltage and ground. In one configuration, an asynchronous configuration, an input node has a diode disposed between the input and ground and a first switching transistor switch disposed between the input and the positive DC voltage. The switching rate of the first switching transistor defines what the output voltage will be. In another mode, a synchronous mode, the diode is replaced by a second switching transistor. This second switching transistor is switched open whenever the first switching transistor is switched closed and the second switching transistor switched closed whenever the first switching transistor is switched open. In this manner, the input to the tank circuit is connected to either the positive input voltage or to ground.

In the case of the asynchronous switching operation, regulation is maintained relatively well at low currents. However, at high currents, the efficiency is degraded due to power lost in the flyback diode. With respect to the synchronous switching operation, this has some drawbacks for low current operation in that the operation of the switching FET connected to ground can consume more power than the flyback diode. The synchronous operation is better for high current applications whereas the asynchronous operation is much more useful for the low current operations.

With respect to efficiency of operation, there have been provided switching regulators that vary the type of modulation in order to select the most efficient operation for a given current level. For example, one switching type regulator may operate under pulse width modulation and one may operate under pulse frequency modulation. These two types of modulation have different types of efficiencies depending upon the current; i.e., one topology operates more efficiently at low currents as compared to the other, which operates more efficiently at high currents. By selecting between the two, a better efficiency rating can be obtained for the overall switching regulator as a function of current.

SUMMARY OF THE INVENTION

The present invention disclosed and claimed herein comprises an adaptive DC-DC converter. The DC-DC converter includes an output reactive circuit having an input connected to the input node and an output. A series inductance is disposed between said input and output with the capacitor disposed between said output and ground. A first transistor switch is connected between a positive supply and said input node, and a second switch is connected between said input node and ground. The first and second switches are controlled by a regulation control circuit to operate in either a synchronous mode or an asynchronous mode. In the synchronous mode, both switches are switched by applying control waveforms thereto in accordance with a synchronous mode of regulation. In the asynchronous mode, only the first switch is driven by applying a clock signal thereto in accordance with an asynchronous mode of regulation. A monitoring circuit monitors efficiency regulation provided by the regulation control circuit and all modes of operation thereof. A determination is made as to which of the modes is most efficient in accordance with the load provided on the output of the reactive circuit. The monitoring circuit is operable to switch to the most efficient mode of operation in the control circuit.

In another aspect of the present invention, a third mode of operation, a linear regulation mode, is provided. The linear regulation mode is effected by inhibiting switching of the first and second switches and attaching a linear regulator to the input node. The monitoring circuit determines via a current measurement when the linear regulator will maintain regulation, and then control the control circuit to operate in this mode of regulation.

In yet another aspect of the present invention, a fourth mode of regulation is provided, which is a modified asynchronous mode of operation. In the modified asynchronous mode of operation, the frequency of the clock provided to the first switch, with the second switch inhibited, is decreased to improve efficiency for a given range of current. The monitoring circuit is operable to monitor the efficiency, including this mode of operation, to determine if this mode of operation should be selected by the regulation control circuit.

In a further aspect of the present invention, the current provided by the DC-DC converter is monitored. One of the modes of operation is a preferred mode of operation with the remaining mode of operations being non-preferred modes of operation. The current is monitored in the non-preferred mode of operation and, when tile current falls below a predetermined current threshold, the control circuit is prompted to switch tile mode of operation to the preferred mode of operation for maximum efficiency.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates timing diagrams for the various clock signals utilized for the gate control circuitry;

FIG. 8 illustrates a detail of the timing circuitry utilized for the blanking signal when changing from the synchronous operation to the asynchronous operation;

FIG. 8a illustrates a detail of the timing diagram of FIG. 8;

DETAILED DESCRIPTION OF THE INVENTION

Figure 1:
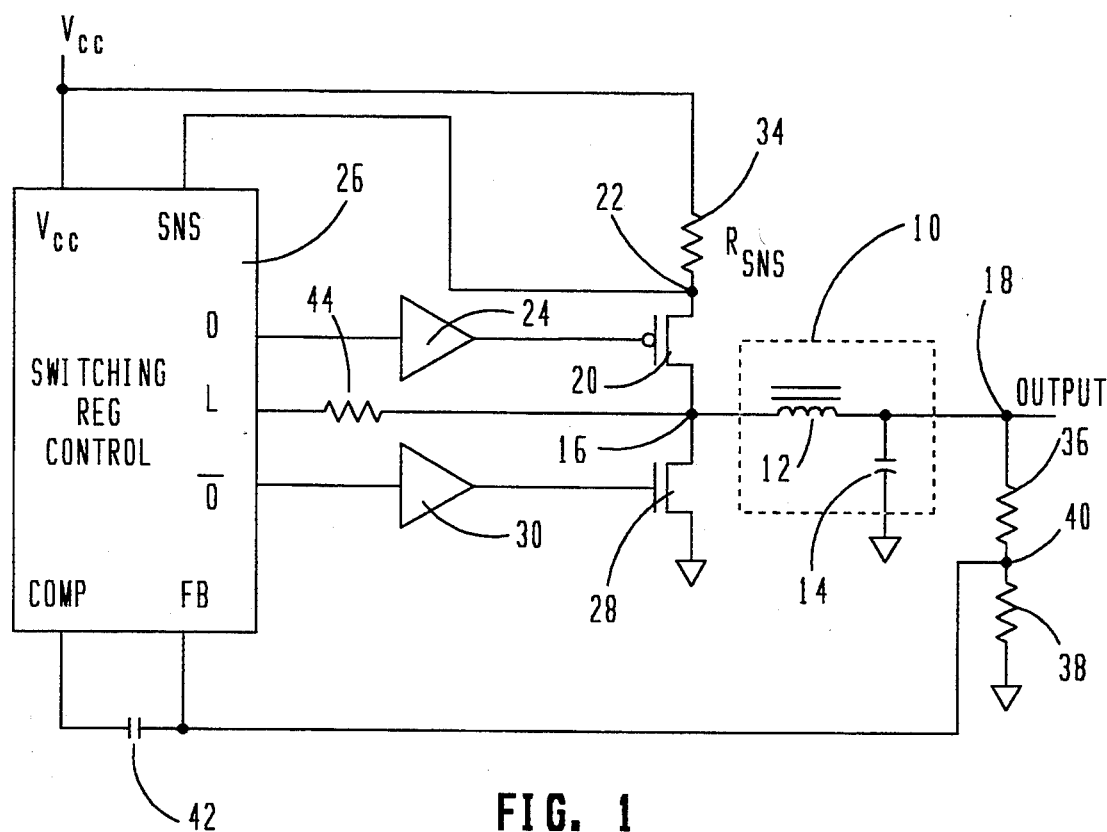
FIG. 1 illustrates an overall block diagram of the present invention.

Referring now to FIG. 1, there is illustrated an overall block diagram of the present invention. A regulator circuit is illustrated which includes on the output a tank circuit 10. The tank circuit 10 is comprised of an inductive element 12 and a capacitive element 14. The inductive element 12 is disposed in series between an input node 16 and an output node 18. The capacitive element 14 has the positive plate thereof connected to the output node 18 and the negative plate thereof connected to ground. A first P-channel switching transistor 20 is provided with the source/drain path thereof connected between a node 22 and the node 16, and the gate thereof connected to the output of a driver 24. The input of the driver 24 is connected to the output "O" of a switching regulator circuit 26. A second N-channel switching transistor 28 is provided with the source/drain path thereof connected between the node 16 and ground, and the gate thereof connected to the output of a second driver 30, similar to the first driver 24. The input of the driver 30 is connected to the output "O-Bar" of the switching regulator circuit 26. The node 22 is connected to one side of a sense resistor 34 labelled $R_{SNS}$, the other side thereof connected to the terminal $V_{cc}$. The node 22 is connected to an SNS input to the switching regulator circuit 26 and the $V_{cc}$ input of the switching regulator circuit 26 is connected to the overall supply voltage $V_{cc}$.

The output node 18 is connected to one side of two series connected resistors 36 and 38, the other side thereof connected to ground. The common connection between the two resistors 36 and 38 provide a feedback node 40, which feedback node 40 is connected to the feedback input FB of the switching regulator circuit 26. A compensation capacitor 42 is provided between the node 40 and the compensation COMP input to the switching regulator circuit 26. The switching regulator circuit 26 is operable to generate the control signals 0 and 0-Bar, which are conventional signals generated for use with a synchronous switching regulator; that is, the control signal for transistor 20 is turned on at one time when transistor 28 is off and transistor 28 is turned on during the time transistor 20 is turned off. The duty cycle of each of the transistors is adjusted by the switching regulator control circuit 26 to provide the appropriate output voltage on the node 18. Both the duty cycle and the switching frequency are adjusted internal to the switching regulator circuit 26. The detailed description of the generation of the switching signal will not be described herein, as this is a conventional operation.

An additional voltage sense resistor 44 is provided which is connected between the node 16 an input "L" of the switching regulator circuit 26. The resistor 44 provides a high impedance input to the switching regulator circuit 26 for sensing the actual input voltage to the output circuit 10. The use of this L input also will be described in detail hereinbelow.

Figure 2A:
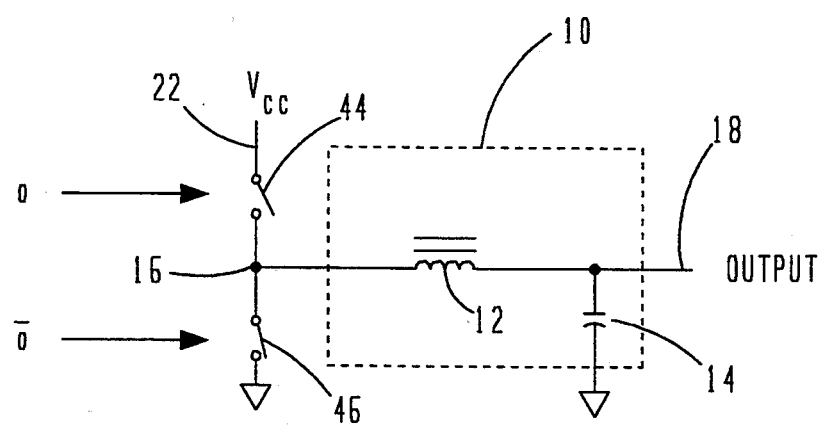
FIGS. 2a, 2b and 2c illustrate three different configurations for the input switches of the present invention.
Figure 2B:
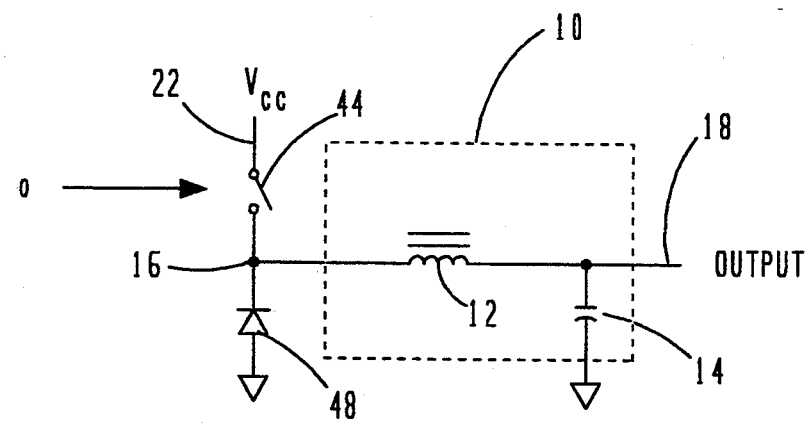
Figure 2C:
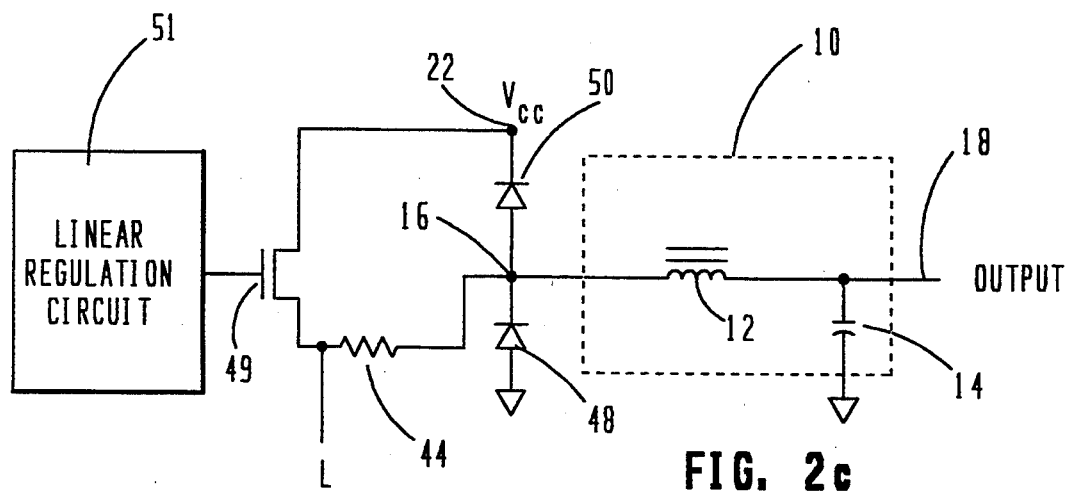

Referring now to FIGS. 2a-2c, the operation of the present invention will be described hereinbelow. By utilizing the voltage sensed on node 22 and comparing it with the voltage $V_{cc}$, a voltage difference across the resistor 34 (not shown) can be determined. By knowing the value of the resistor 34 (not shown), the current to the node 22 can be determined. This will provide an overall current measurement. Additionally, the voltage on node 16 is sensed. By utilizing both of these parameters, various operating points of the overall switching regulator can be determined. These are utilized to switch to one of multiple modes. In a first mode, the switch is operated in a synchronous mode, with both transistors 20 and 28 operating in conventional synchronous operation. In another and second mode, transistor 28 is disabled such that the junction isolation diode will be present between node 16 and ground, this will be described in more detail hereinbelow. In this mode, asynchronous operation will be present. In a third mode of operation, a decrease in current results in the frequency of the switching regulator circuit 26 (FIG. 1) being varied. In a fourth mode of operation, both transistors 20 and 28 are disabled. An internal linear regulator then supplies current to the node 16, thus resulting in a linear regulation operation. Each of these operational modes provide certain benefits when operating under favorable current and voltage constraints. In this manner, a wider range of operating current can be tolerated without sacrificing overall efficiency and regulation. Further, this operation is automatically determined by the switching regulator control circuit 26 (FIG. 1) by sensing both the voltage at node 16 and the current through resistor 34 to determine the appropriate mode of operation necessary to maintain proper regulation. Further, this is an adaptive operation that selects the mode of operation as a function of the load presented to the regulator.

With specific reference to FIG. 2a, the synchronous operation can be seen wherein two switches 44 and 46 replace switches 20 and 28, respectively. The switches are controlled by the signals O and O-Bar to synchronously drive the node 16.

With specific reference to FIG. 2b, there is illustrated the asynchronous operation wherein the switch 46 is replaced by a diode 48 disposed between node 16 and ground. The cathode of diode 48 is connected to the node 16 and the anode thereof connected to ground. As described above, this diode 48 is merely the junction isolation diode of the transistor 28. In this mode, the switch 44 closes and pulls node 16 high and reverse biases diode 48. When switch 44 is open, the voltage of node 16 will go below ground potential until it reaches one diode drop below ground potential, at which time diode 48 is forward biased and current flows from ground to node 16. It can be seen that for high current levels, the dissipation of the diode 48 would cause some conversion losses. Alternatively, at low energy levels, the current required to drive transistor 28/46 will be too high, thus favoring asynchronous operation.

With specific reference to FIG. 2c, the linear operation mode is illustrated. In this mode, the switch 44 is replaced by a diode 50, disposed between the node 16 and the node 22, with the cathode thereof connected to the node 22 and the anode thereof connected to node 16. Diode 48 is also disposed between node 16 and ground, the diodes 48 and 50 representing the junction isolation diodes of the transistors 28 and 20, respectively in the conventional operating node.

The "L" input to the regulator circuit 16 is connected through the source/drain path of a transistor 49 to $V_{cc}$. The gate of transistor 49 is connected to a linear regulation circuit 51 that controls the transconductance of transistor 49 to maintain the voltage at node 18 at a regulated level. The linear regulation circuit 51 is a conventional circuit that is well known in the art. The current levels of the linear regulation mode of operation are below approximately one milliamp. If higher current levels exist, the power dissipated in transistor 49 will be unacceptable. Therefore, higher currents result in switching to one of the other modes of operation, typically back to the synchronous mode of operation. As will be described hereinbelow, the regulation is sensed and, if the circuit is about to lose regulation in any mode of operation, the circuit always switches back to the synchronous mode of operation. However, it should be understood that the mode of operation could switch to any other mode of operation under these conditions to achieve improved regulation and regulation integrity.

Figure 3:
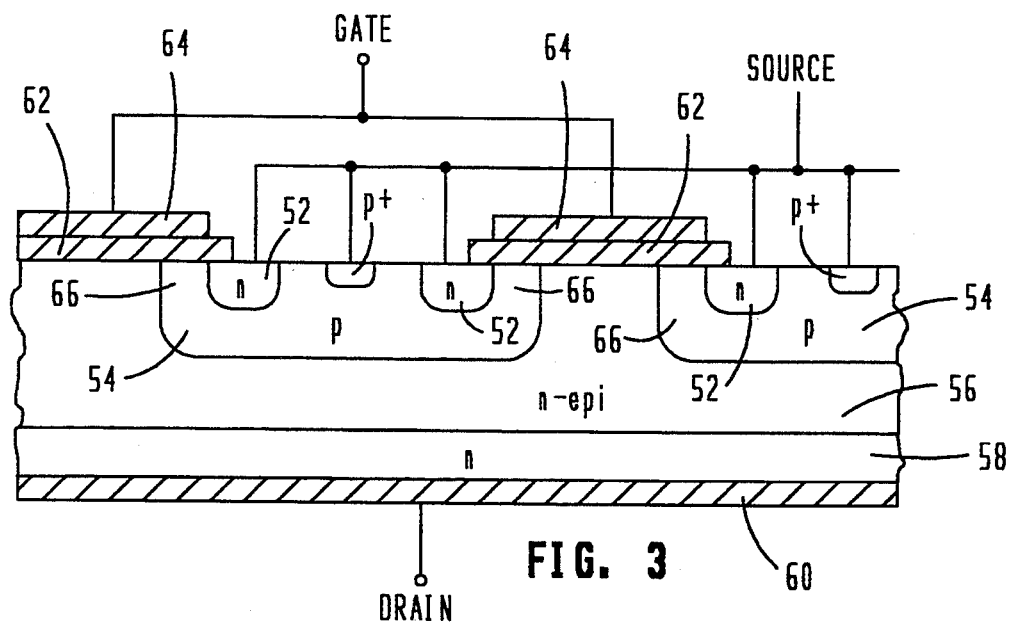
FIG. 3 illustrates a cross-sectional diagram of a typical switching transistor.

Referring now to FIG. 3, there is illustrated a cross sectional diagram of each of the switching transistors 20 and 28. The transistors 20 and 28 are power transistors which are N-type MOS transistors. Each of the transistors 20 and 28 have a plurality of N-type source regions 52 disposed in a plurality of P-type wells 54. Although illustrated in cross-sectional view, each of the source regions 52 in each of the P-type wells 54 is comprised of a donut shaped implant region that is disposed in a P-type well 54 such that the outer peripheral edge of the donut shaped implant region forming the source regions 52 is disposed a predetermined distance from the outermost edge of the P-type well 54. This will form the channel region, which is a lateral channel. Each of the P-type wells 54 is formed in an N-type expitaxial layer 56 which is formed on an N-type substrate 58. A drain metallization layer 60 is disposed on the lower side of the N-type substrate 58. A layer of gate oxide 62 is formed over a portion of the P-type well 54 between the outermost edge of the donut shaped implant region forming the N-type source regions 52 and the outermost edge of the P-type well 54. A gate electrode 64 is disposed over the gate oxide layer 62. This will therefore define the channel regions 66 under each of the gate electrodes 64. It can be seen that a channel region will be formed between the N-type source region 52 within the P-type well 54 and extending to the N-type expitaxial layer 56. Current will then flow down through the N-type expitaxial layer 56 to the N-type layer 58 and to the drain metallization layer 60. The sources of the transistor at implant regions 52 are connected to the P-type wells 54 to form the junction isolation diodes.

Figure 4:
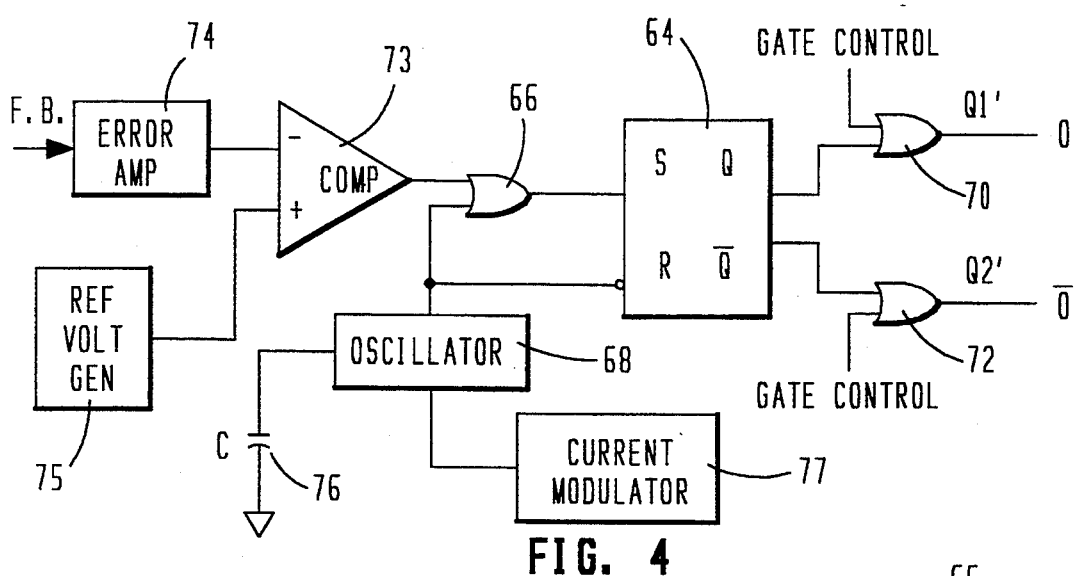
FIG. 4 illustrates a detailed block diagram of the switching operation of the present invention.

Referring now to FIG. 4, there is illustrated an overall block diagram of the switching regulator control circuit 26, which describes the conventional output operation. A set/reset flip-flop 64 is provided, having the input thereof connected to the output of an AND gate 66 and the reset input thereof being configured as an inverting input and connected to the output of an oscillator 68. The output of the oscillator 68 is also connected to one input of the AND gate 66. The Q-output of the flip-flop 64 comprises the Q1 signal, which is input to one input of an AND gate 70. The other input of the AND gate 70 is connected to the gate control signal and the output of AND gate 70 provides the Q1' signal which is also the output control signal O for the transistor 20. The Q-bar output of flip-flop 64 is connected to one input of an AND gate 72, the Q-bar output of flip-flop 64 providing the Q2 output. The output of AND gate 72 comprises the 0-bar output signal for control of the gate of the transistor 28. This output is labelled Q2'. The other input of gate 72 is connected to a gate control signal.

The other input of AND gate 66 is connected to the output of a comparator 73, the negative input thereof connected to the output of an error amplifier 74, the input of error amplifier 74 connected to the feedback signal FB. The positive input of the comparator 73 is connected to a reference voltage generator 75. The oscillator 68 is connected to an external capacitor 76, which provides timing information thereto. The oscillator 68 is connected to a current modulator 77, which is operable to modulate the frequency of the oscillator 68 and vary it in one mode of operation. The oscillator 68 has internal thereto a current source which is operable to provide a constant current to the capacitor 76, this circuitry being conventional and not shown. By varying the constant current provided by the internal current source, the frequency of the oscillator can be changed. Again, this is conventional circuitry and is not shown in detail.

The structure of FIG. 4, with the exception of the current modulator 77 is relatively conventional switching regulator circuitry which can be found in Part No. MC34063, manufactured by Motorola Corporation, which is a monolithic control circuit containing all the active functions required for a DC-to-DC converter. The oscillator 68, as described above, is composed of a current source, which charges and discharges the timing capacitor 76 between an upper and lower preset threshold. The typical charge and discharge currents will define the ratio of the ramp-up period and the ramp-down period. The upper threshold is equal to the internal reference voltage provided by the reference voltage generator 75. The oscillator will therefore run continuously at a rate controlled by the selected value of the timing capacitor 76 and also the current provided by the internal current source to the oscillator 68. This, of course, is controlled by the current modulator 77.

During the ramp up portion of the cycle, a logic "1" is present at the input of the AND gate 66 connected to the oscillator 68 and also connected to the inverting reset input of the latch 64. If the output voltage of the switching regulator is below nominal, a logic "1" will also be present at the other input of the AND gate 66 connected to the output of the comparator 73. This condition will set the latch 64 and cause the Q-output to go to a logic "1" raising the Q1 signal high. When the gate control signal on the AND gate 70 is high, the output signal O will be at a logic "1" state. When the oscillator reaches its upper threshold, the timing capacitor 76 will start to discharge and a logic "0" will be present at the output of the oscillator 68 and on the inverting reset input of the flip-flop 64. This condition will cause the Q-output to go low and the Q-bar output to go high which, if the gate control signal on the AND gate signal 72 is high, raises the output 0-bar high.

The output of the comparator 73 can set the flip-flop 64 only during the ramp-up of the capacitor 76, and can initiate a partial or full-on cycle of output switch conduction. Once the comparator 73 has set the flip-flop 64, it cannot reset it. The flip-flop 64 will remain set until the capacitor 76 begins ramping down. Thus, the comparator 73 can initiate the output switch connection of transistor 20, but cannot terminate it, and the flip-flop 64 is always reset when the capacitor 76 begins ramping down to initiate a partial or full-on cycle of the output which causes conduction of transistor 28.

Figure 5:
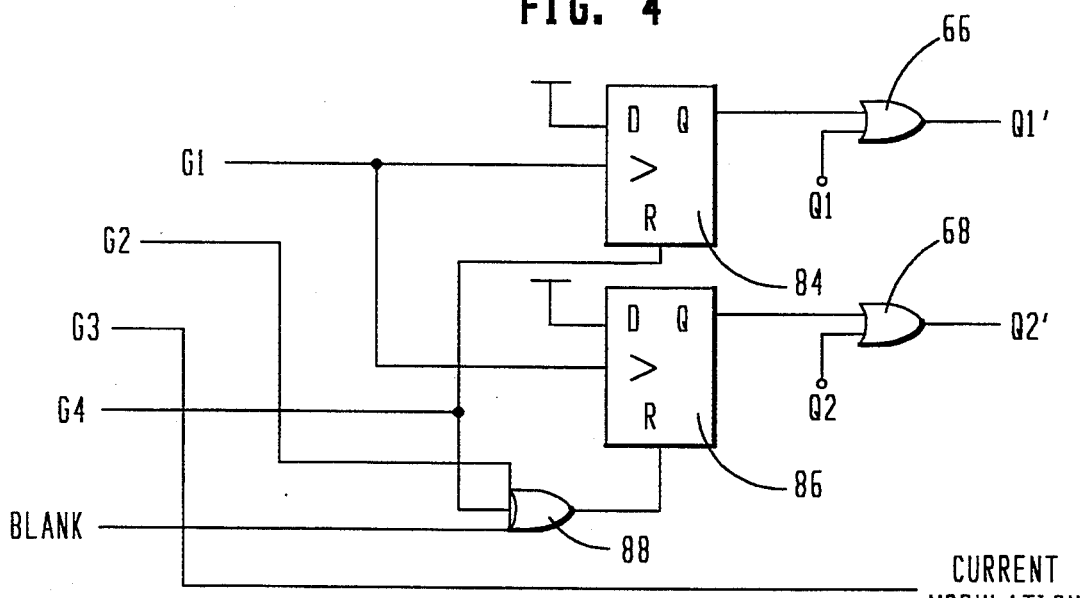
FIG. 5 illustrates a block diagram of the gating circuitry.

Referring now to FIG. 5, there is illustrated a block diagram of the gating circuitry. There are four modes of operation that generate the four gating signals G1, G2, G3 and G4. G1 is associated with the synchronous mode of operation, G2 is associated with the second and asynchronous mode of operation, G3 is associated with the third mode of operation wherein the duty cycle of the asynchronous operation is changed and G4 is associated with the fourth mode of operation, the linear mode. A first set/reset flip-flop 84 is provided having the set input thereof connected to the G1 signal. The Q-output thereof is connected to the other input of the AND gate 66 to provide the gate control signal therefor. Similarly, a second set/reset flip-flop 86 is provided, having the set input thereof connected to the G1 control signal and the Q-output thereof connected to the other input of the AND gate 68 to provide the gate control signal therefor. The reset input of the flip-flop 84 is connected to the G4 signal such that it is disabled whenever the linear mode of operation is implemented. Both the G2 and the G4 signal are input to one input of a three input OR gate 88, the output thereof connected to the reset input of the flip-flop 86. Additionally, a signal "Blank" is connected to the other input of the NOR gate 88. Therefore, whenever the G2 signal is generated, the G4 signal is generated or the Blank signal is generated. Whenever the G1 signal is generated, the flip-flops 84 and 86 will be set. Additionally, the G3 input is connected as an output to provide the current modulation signal which will result in the duty cycle being increased by a factor of 4×.

Figure 6A:
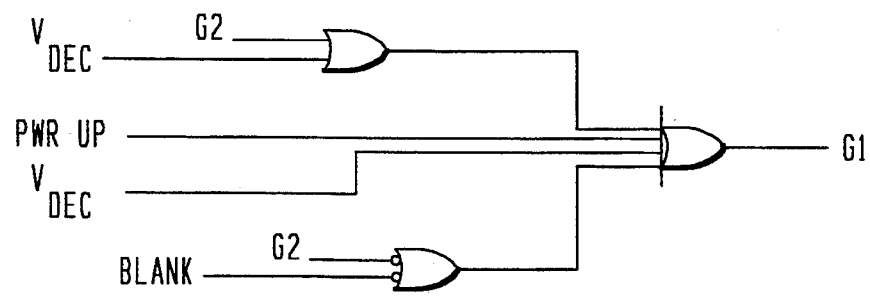
FIGS. 6a–6d illustrate logic diagrams for the circuitry for generating the four separate logic control circuits G1–G4.

Referring now to FIG. 6a, there is illustrated a detailed logic diagram for the circuitry for generating the G1 control signal. A multiple input OR gate 92 is provided for providing on the output the G1 control signal. The inputs thereto basically determine whenever the G1 signal is generated. A PwrUp signal is provided on a power up initiation sequence. Therefore, whenever a system goes into power up, it initially will go into the synchronous mode of operation. The PwrUp signal will only be present for a short time, sufficient to clock through the value in tile flip-flop 84. G1 will also be generated in the event that the Blank signal and the G2 signal are not generated, this being described hereinbelow. The G2 signal is input to the inverting input of an AND gate 94 and the Blank signal is input to an inverting input of the AND gate 94. The output of the AND gate 94 is input to one input of the OR gate 92. Additionally, whenever both the G3 signal is present and a signal $V_{DEC}$ are present, the G1 signal will go high. This is an operational mode wherein tile third mode of operation has been selected and it has been determined that the voltage at the FB input has fallen below a predefined limit, indicating that the circuit is about to lose regulation. Both of these inputs are input to respective inputs of an AND gate 96, the output thereof connected to one input of an OR gate 92. This mode allows the regulator to switch directly to the synchronous mode from the third mode of operation.

Figure 6B:
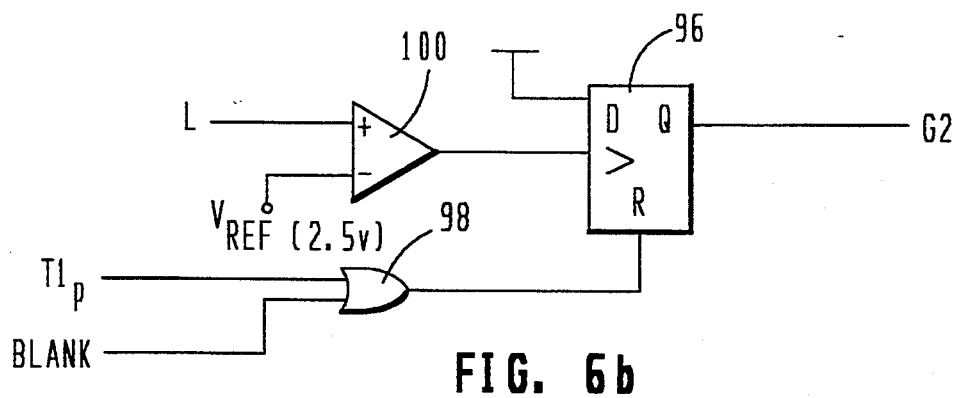

Referring now to FIG. 6b, there is illustrated a logic diagram for generating the G2 signal associated with the second mode of operation, the asynchronous mode. A set/reset flip-flop 97 is provided having the Q-output thereof providing a G2 control signal and a reset input associated therewith connected to the output of a two input OR gate 98. The S-input of the flip-flop 97 is connected to the output of a comparator 100. The positive input of the comparator is connected to the "L" input of the regulator control circuit 26 and the negative input thereof is connected to a 2.5 volt reference. When it is determined that the voltage on the "L" input is above 2.5 volts, the Q-output thereof will go high. The reset input on the flip-flop 97 is held low until both the Blank signal and a clock signal Tlp is generated, which clock signal and Blank signal are input to respective inputs of the OR gate 98. When either one of these is not generated, the reset input is held low and the output G2 is held low.

Figure 6C:
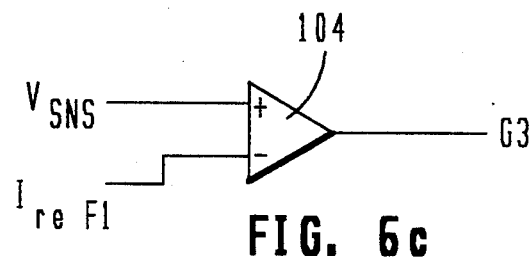

Referring now to FIG. 6c, there is illustrated a logic diagram for the circuitry to generate the G3 signal. The voltage $V_{SNS}$, which is the voltage across resistor 34, is input to the positive input of a comparator 104, the negative input thereof connected to a first reference voltage $I_{REF1}$, this reference voltage $I_{REF1}$ corresponds to a first current reference point. When the voltage $V_{SNS}$ falls below this reference voltage, this indicates that the current through the resistor 34 has fallen below a predetermined reference voltage. This will result in the output of comparator 104 going high, this representing the G3 control signal.

Figure 6D:
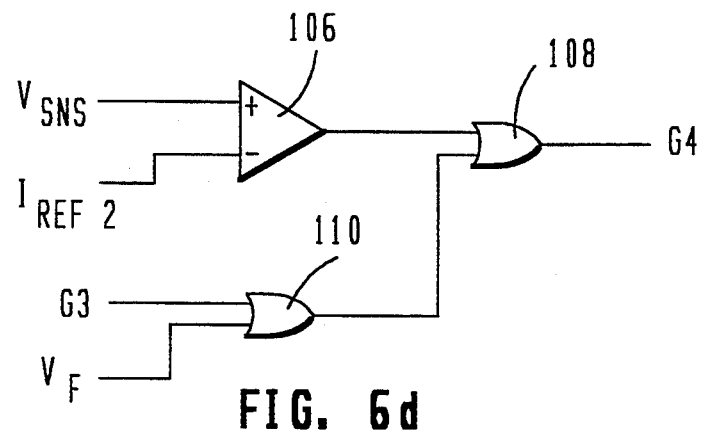

Referring now to FIG. 6d, there is illustrated a logic diagram for the circuitry to generate the G4 signal. The voltage $V_{SNS}$ across the resistor 34 is input to the positive input of a comparator 106, the negative input thereof connected to a reference voltage $I_{REF2}$, which reference voltage corresponding to a second current reference point below the first current reference point. The output of comparator 106 is input to one input of an OR gate 108, the other input thereof connected to the output of an AND gate 110. One input of AND gate 110 is connected to the G3 signal and the other input is connected to a voltage $V_{SNSH}$, the voltage $V_{SNSH}$ indicating a condition wherein the voltage level on the FB input has risen above a predetermined voltage level. This is a the point at which switching occurs from the third mode of operation to the fourth mode of operation, as will be described hereinbelow. The voltage $I_{REF2}$ is a voltage associated with a second current level that is lower than the first current level associated with the voltage $I_{REF1}$ that provides a switching operation from the third mode of operation to the fourth mode of operation. The signal will only be generated the circuit is operating in the third mode of operation.

Figure 6E:
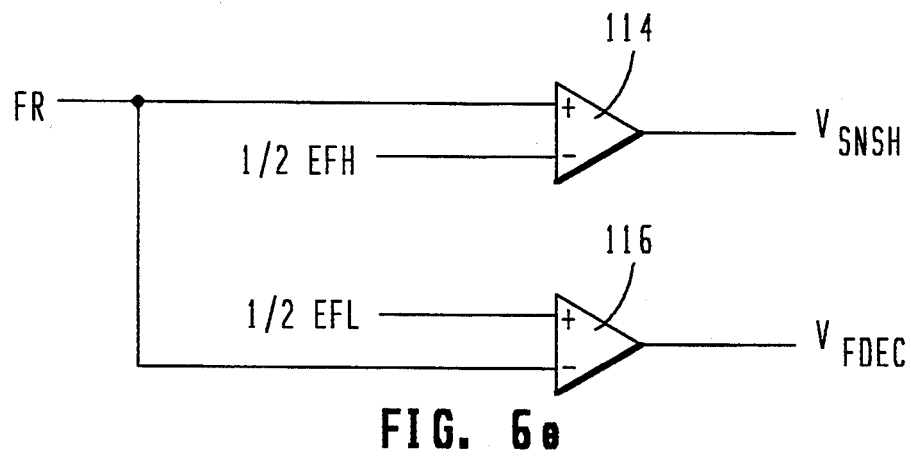
FIG. 6e illustrates a logic diagram for determining the direction of the rate of change of the voltage.

Referring now to FIG. 6e, there is illustrated a logic diagram of the circuitry for generating the voltage $V_{SNSH}$ and $V_{DEC}$. A first comparator 114 is provided with the output thereof providing the $V_{SNSH}$ signal. The positive input of comparator 114 is connected to the "FB" input and a negative input thereof is connected to a high reference voltage $V_{REFH}$. A second comparator 116 provides on the output thereof the control signal $V_{DEC}$, a positive input thereof connected to the reference voltage $V_{REFL}$ and the negative input thereof connected to the "FB" input thereof. The circuitry of FIG. 6e provides a window comparator.

Referring now to FIG. 7, there is illustrated a timing diagram for the various clock signals Q1, Q2, TID and Blank. The Q1 and Q2 signals, as described above, are generated by the switching regulator control circuit described in FIG. 4 with respect to the error amplifier 72 and comparator 66. Depending upon the value of the capacitor 76 and the current provided by the current source 78, the respective duty cycles of the signals Q1 and Q2 will vary. However, it can be seen that the clock signal Q1 is high whenever the clock signal Q2 is low. The signal Tlp is a pulse that is generated off the falling edge of Q1 or the rising edge of Q2. This is a short duration pulse which, with reference to FIG. 6b, will reset flip-flop 96 to force G2 low. This will occur each cycle of Q1 and Q2.

Periodically, the Blank signal is generated, which is generated prior to the rising edge of Q2 and the falling edge of Q1. The Blank signal will also Blank the Tlp clock signal. Whenever this occurs, it can be seen that the flip-flop 86 is reset, as illustrated in FIG. 5, such that the output of the flip-flop goes low, thus pulling the output of AND gate 68 and Q2' low. During this time, a sensing operation is performed. This is illustrated in FIG. 8. In FIG. 8, it can be seen that the waveform Q2' is set low whenever the Blank signal is high. Additionally, the flip-flop 96 is reset such that the Q2 is low at the falling edge of Q1. This, therefore, provides the diode 48 disposed between node 16 and ground. It can be seen with reference to the L-waveform in FIG. 8 that the voltage will go below ground by one diode drop and only rise above a 2.5 volt level prior to the leading edge of Q1 if the appropriate mode of operation is asynchronous. If the voltage remains below ground, it is an indication that the synchronous mode of operation will provide the appropriate regulation. The blanking pulse is typically more than one period of the Q1 and Q2 signal.

With reference to FIG. 8a, there is illustrated a detail of a portion of the waveform during the blanking pulse. It can be seen that the flip-flop 96 must be reset at the end of each Q1 pulse on the falling edge thereof such that G2 is held low. The voltage will then fall one diode drop below ground through the asynchronous operation and then, if the appropriate mode is asynchronous, the voltage will rise above the 2.5 volts at a point 118 on the waveform. If this occurs prior to the leading edge of the Q1 waveform, this will indicate that the current drawn through the diode in that cycle is at such a level that an asynchronous operation will provide a more efficient mode of operation and that regulation can be maintained in this will be a more efficient mode of operation. However, if a synchronous operation is not the appropriate mode, the voltage will typically stay below 2.5 volts and typically, below zero volts, as indicated by a dotted line 120. This will, therefore, provide the basic decision aspects for switching from the first mode of operation to the second mode of operation. Further, in the event that the voltage does not go above 2.5 when the mode of operation is determined to be a synchronous operation, this indicates that it should be switched back to the first mode of operation. In this event, the G2 signal will not be generated during the blanking signal and the AND gate 94 in FIG. 6a will result in a G1 signal again being generated.

Figure 9:
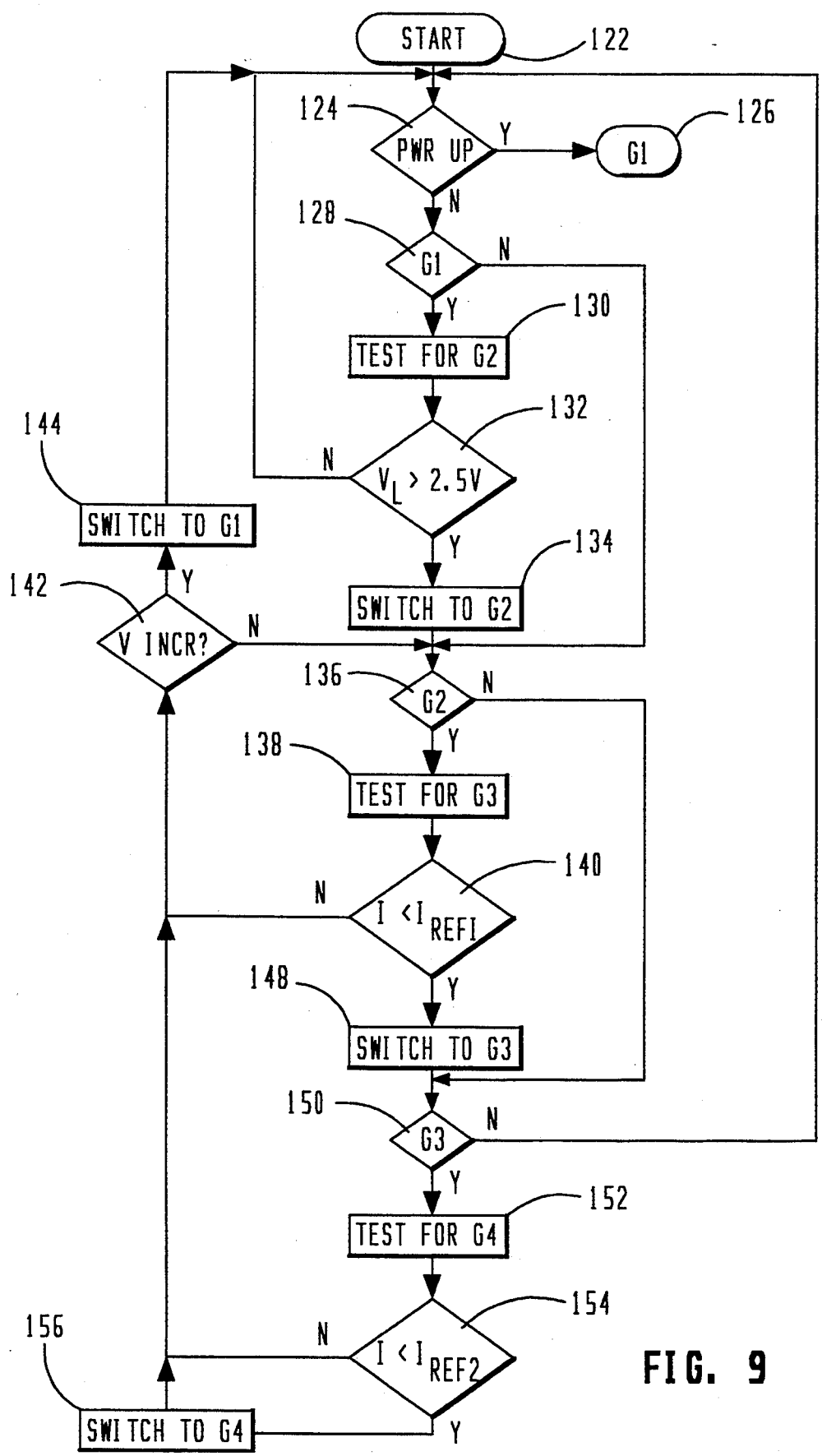
FIG. 9 illustrates a flowchart for the operation of the adaptive power converter of the present invention.

Referring now to FIG. 9, there is illustrated a flowchart depicting the operation of the adaptive DC-DC converter of the present invention. A flowchart is initiated at a starting block 122 and then proceeds to a decision block 124 to determine if a power up condition exists. If so, the program flows to a block 126 to switch to the G1 operation. If the power up signal is not present, the program then flows to a decision block 128 to determine if the signal G1 is present indicating the first mode of operation. If so, the program then flows to a function block 130 to test for the presence of a G2 signal, indicating that the system is operating in the second mode of operation. As described above, this requires the Blank signal to be generated periodically such that the transistor 28 is replaced by the diode 48 for one or two cycles. The program then flows to a decision block 132 to determine if the voltage of the "L" input is greater than 2.5 volts. If not, the program flows along an "N" path back to the input of decision block 124. However, if the voltage is greater than 2.5 volts, this indicates that the regulation mode should be switched to the second mode of operation and the signal G2 is switched on, as indicated by a function block 134. The program will then flow to a decision block 136 to determine if the G2 signal is present. The "N" path of the decision block 128 also flows through the input of decision block 136. If the second mode of operation is present, indicated by the G2 signal, the program will then flow to a function block 138 to perform a test for the third mode of operation to generate the G3 signal. The program will then flow to a decision block 140 to determine if the current is greater than the first current reference voltage $I_{REF1}$. If not, the program will flow along an "N" path to the input of a decision block 142 to determine if the voltage at the "FB" input is decreasing. If so, the program flows along the "Y" path to a function block 144 to switch the G1 signal on and then switch to the first mode of operation. However, if voltage is not decreasing at the "FB" input, the program flows along the "N" path and back to the input of decision block 136.

If the current is less than the first reference current, as determined by the decision block 140, the program flows from the decision block 140 along a "Y" path to the input of a function block 148 to switch to the third mode of operation, indicated by the G3 signal being present. The program then flows to a decision block 150 to determine if the G3 signal is present. If not, the program flows along an "N" path back to the input of the decision block 124. However, if the G3 signal is present, the program flows along the "Y" path from decision block 150 to a function block 152 to test for a fourth mode of operation. The program will then flow to a decision block 154 to perform a test to determine if the current is less than the reference current for $I_{REF2}$. If the current is less than this current, the program will flow along the "Y" path to a function block 156 to switch to the fourth mode of operation, as indicated by the presence of a G4 signal, and then to the input of decision block 142. However, if the current is not greater than the second reference current, the program will flow from the decision block 154 along the "N" path back to the input of the decision block 142 to again determine if the voltage is decreasing. Whenever the voltage is decreasing, this indicates that the system is about to lose regulation. In this case, the program will always flow to the first mode of operation, indicated by the G1 signal and then back to the input of the decision block 124.

In summary, there has been provided an adaptive DC to DC converter which includes two switching transistors, one connected between a positive supply and an input node to a reactive output circuit and the other transistor connected to the input of the reactive output circuit and ground. The switching transistors are controlled by a switching regulator to work in either a synchronous switching regulator operation or an asynchronous switching regulator operation. Further, a fourth mode is provided wherein the input to the output reactive circuit is connected to a linear regulator. The voltage on the input to the reactive circuit is monitored in addition to the current provided thereto. These parameters are monitored in order to determine if one of the multiple modes, the asynchronous operation, the synchronous operation or the linear operation will adequately regulate the voltage to a given load and provide the most efficient mode of operation. Once this is determined, the appropriate mode is chosen to maintain regulations over a wide range of operating currents.

Although the preferred embodiment has been described in detail, it should be understood that various changes, substitutions and alterations can be made therein without departing from the spirit and scope of the invention as defined by the appended claims.

What is claimed is:

1. An adaptive DC-DC converter, comprising:
   an output reactive circuit having an input connected to an input node and an output, with a series inductor disposed between said input and output and a capacitor disposed between said output and ground to provide on the output thereof a regulated voltage;
   a first switch connected between a positive supply and said input node;
   a second switch connected between said input node and ground;
   a first diode disposed between said input node and ground with the anode thereof connected to ground and the cathode thereof connected to said input node;
   a regulation control circuit for operating in a synchronous mode and in an asynchronous mode, said control circuit operable in said synchronous mode to drive both said first and second switches in accordance with a synchronous mode of regulation wherein said first and second switches are switched at a synchronous rate with said first and second switches operated in a complement manner, and in said asynchronous mode to drive only said first switch at an asynchronous rate in accordance with an asynchronous mode of regulation with said second switch disposed in a non-conductive state; and
   a monitoring circuit for monitoring the efficiency of regulation provided by said regulation control circuit in the associated modes of operation and determine which of said modes of operation of said regulation control circuit are most efficient in accordance with predetermined efficiency parameters, said monitoring circuit operable to switch to the most efficient mode of operation.

2. The DC-DC converter of claim 1, wherein one of said synchronous and asynchronous modes of operation is the preferred mode of operation and further comprising, a regulation monitoring circuit for monitoring the regulation provided by the non-preferred mode of operation of said regulation control circuit and switching to the preferred mode of operation when the regulation provided by the non-preferred mode of operation falls below a predetermined regulation threshold in accordance with predetermined regulation parameters.

3. The DC-DC converter of claim 1, wherein said first and second switches comprise first and second transistor switches, and said second transistor switch has associated therewith a junction isolation diode, said first diode comprising said junction isolation diode of said second transistor switch.

4. The DC-DC converter of claim 1, and further comprising:
   a second diode connected between said positive supply and said input node; and
   a selectively activatable linear regulator for providing a linear regulation mode of operation controlled by said control circuit, wherein said control circuit is operable to inhibit the driving of said first and second switches and selectively activate said linear regulator in said linear regulation mode, said monitoring circuit operable to control said control circuit to operate in said linear regulation mode when it is determined, in accordance with said predetermined efficiency parameters that are utilized to determine the efficiency of regulation provided by the modes of operation of said regulation control circuit, that said linear regulation mode of operation is preferred.

5. The DC-DC converter of claim 3, and further comprising a modified asynchronous mode of operation wherein the frequency of the signal driving said first transistor switch is varied as compared to said asynchronous mode of operation, wherein said monitoring circuit is operable to determine the efficiency of operation of all modes of operation including the modified asynchronous mode of operation.

6. A method for adaptively converting DC-to-DC, comprising the steps of:
   providing an output reactive circuit having an input connected to an input node and an output, with a series inductor disposed between the input and output and a capacitor disposed between the output and ground to provide on the output thereof a regulated voltage;
   connecting a first transistor switch between a positive supply and the input node;
   connecting a second transistor switch between the input node and ground;
   disposing a first diode between input node and ground with the anode thereof connected to ground and the cathode thereof connected to the input node;
   operating the first and second transistor switches in a synchronous mode of operation by driving both the first and second transistor switches in accordance with a synchronous mode of regulation with a regulation control circuit wherein the first and second switches are switched at a synchronous rate with said first and second switches operated in a complement manner;
   operating only the first transistor switch in an asynchronous mode of operation by driving only the first transistor switch in accordance with an asynchronous mode of regulation by the regulation control circuit at a first asynchronous rate and maintaining the second transistor in a non-conductive state; and
   monitoring the efficiency of regulation provided by the step of operating in either the synchronous or asynchronous modes with the regulation control circuit and determining which of the modes of operation are most efficient in accordance with the predetermined efficiency parameters, the step of monitoring operable to select operation in the most efficient one of the synchronous mode or asynchronous mode of operation.

7. The method of claim 6, wherein one of the steps of operating in the synchronous mode or the asynchronous mode of operation is the preferred mode of operation and further comprising the step of monitoring the regulation provided by the non-preferred mode of operation and switching to the preferred mode of operation when the regulation provided by the non-preferred mode of operation falls below a predetermined regulation threshold in accordance with predetermined regulation parameters.

8. The method of claim 6, wherein the step of providing the first and second switches comprises providing first and second transistor switches, and the second transistor switch having associated therewith a junction isolation diode, the step of disposing the first diode between the input node and ground provided by the step of connecting the second transistor switch between the input node and ground.

9. The method of claim 6, and further comprising:

disposing a second diode between the positive supply and the input node;

providing a selectively activatable linear regulator for providing a linear regulation mode of operation;

inhibiting the driving of the first and second switches and selectively activating the linear regulator in linear regulation mode when the step of monitoring determines, in accordance with the predetermined deficiency parameters, that the linear regulation mode of operation is preferred.

10. The method of claim 6, wherein the step of dropping the first register comprises driving it with a clock signal operating at a predetermined frequency and further comprising operating in a modified synchronous mode of operation and varying the frequency driving signal to the first transistor switch.

* * * * *

UNITED STATES PATENT AND TRADEMARK OFFICE
CERTIFICATE OF CORRECTION

PATENT NO. 5,414,341

DATED : May 9, 1995

INVENTOR(S) : Alan E. Brown

It is certified that error appears in the above-indentified patent and that said Letters Patent is hereby corrected as shown below:

On the Title page, item [54] and Col. 1, line 1;

Replace "ASYNCRONOUS" with --ASYNCHRONOUS--; replace "SYNCRONOUS" with --SYNCHRONOUS--.

Column 2, line 45, replace "tile" with --the--.

Column 3, line 49, replace "0" with --O--.

Column 3, line 50, replace "0-Bar" with --O-Bar--.

Column 3, line 63, replace "an" with --and--.

Column 4, line 67, insert --,-- following "respectively".

Column 5, lines 22 and 23, replace "cross sectional" with --cross-sectional--.

Column 5, line 30, replace "donut shaped" with --donut-shaped--.

Column 5, line 32, replace "donut shaped" with --donut-shaped--.

UNITED STATES PATENT AND TRADEMARK OFFICE
CERTIFICATE OF CORRECTION

PATENT NO. : 5,414,341
DATED : May 9, 1995
INVENTOR(S) : Alan E. Brown

It is certified that error appears in the above-indentified patent and that said Letters Patent is hereby corrected as shown below:

Column 5, line 41, replace "donut shaped" with --donut-shaped--.

Column 6, line 3, replace "0-bar" with --O-bar--.

Column 6, line 60, replace "0-bar" with --O-bar--.

Column 7, line 45, replace "tile" with --the--.

Column 7, line 54, replace "tile" with --the--.

Column 8, line 40, replace "a" with --at--.

Column 8, line 48, insert --when-- following "operating".

Signed and Sealed this

Nineteenth Day of March, 1996

BRUCE LEHMAN

Attest:

Attesting Officer        Commissioner of Patents and Trademarks